United States Patent
Iizumi et al.

(10) Patent No.: US 9,915,788 B2
(45) Date of Patent: Mar. 13, 2018

(54) SEALABLE COMMUNICATION CABLE CONNECTION ASSEMBLIES

(71) Applicant: Senko Advanced Components, Inc., Marlborough, MA (US)

(72) Inventors: Kenji Iizumi, Kowloon (HK); Albert Wong, Tsuen Wan (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/350,526

(22) Filed: Nov. 14, 2016

(65) Prior Publication Data
US 2017/0059783 A1    Mar. 2, 2017

Related U.S. Application Data

(63) Continuation of application No. 14/599,140, filed on Jan. 16, 2015, now Pat. No. 9,494,745.

(51) Int. Cl.
*G02B 6/38* (2006.01)
*G02B 6/44* (2006.01)
(Continued)

(52) U.S. Cl.
CPC ......... *G02B 6/3816* (2013.01); *G02B 6/3887* (2013.01); *G02B 6/4444* (2013.01); *G02B 6/4471* (2013.01); *G02B 6/4494* (2013.01); *H01R 13/5205* (2013.01); *H01R 13/58* (2013.01); *G02B 6/506* (2013.01); *H01R 13/5825* (2013.01)

(58) Field of Classification Search
CPC .................................................. G02B 6/3816
See application file for complete search history.

(56) References Cited

U.S. PATENT DOCUMENTS

| | | | |
|---|---|---|---|
| 2005/0085125 A1* | 4/2005 | Montena | H01R 9/0518 439/578 |
| 2011/0075971 A1* | 3/2011 | Elenbaas | G02B 6/3847 385/55 |
| 2015/0083455 A1* | 3/2015 | Keith | H01R 13/5816 174/73.1 |

OTHER PUBLICATIONS

International Preliminary Report on Patentability dated Jul. 27, 2017 from related International Application No. PCT/US15/057617, International Filing Date Oct. 27, 2015.

* cited by examiner

*Primary Examiner* — Jerry Rahll
(74) *Attorney, Agent, or Firm* — Pepper Hamilton LLP

(57) ABSTRACT

Communication device connection assemblies are described. The sealable connection assemblies are configured to provide water-tight connections for various data transmission elements, including cables, network devices, and computing devices. The connection assemblies may be used for various data transmission protocols, such as fiber optic connections. A compression element of the connection assembly may be configured to engage and compress a sealing element against a communication cable extending through the sealable connection assembly when a tension element is coupled to the inner body, thereby forming a seal between the sealable element and the communication cable. The connection assemblies may include a retainer body configured to form a grip or retention force with a communication cable sufficient to reduce and/or eliminate any forces on the communication cable (i.e., bending and/or straight pull forces) from being transferred to and/or otherwise effecting other components of the connection assembly, such as sealing elements thereof.

17 Claims, 12 Drawing Sheets

(51) Int. Cl.
*H01R 13/52* (2006.01)
*H01R 13/58* (2006.01)
*G02B 6/50* (2006.01)

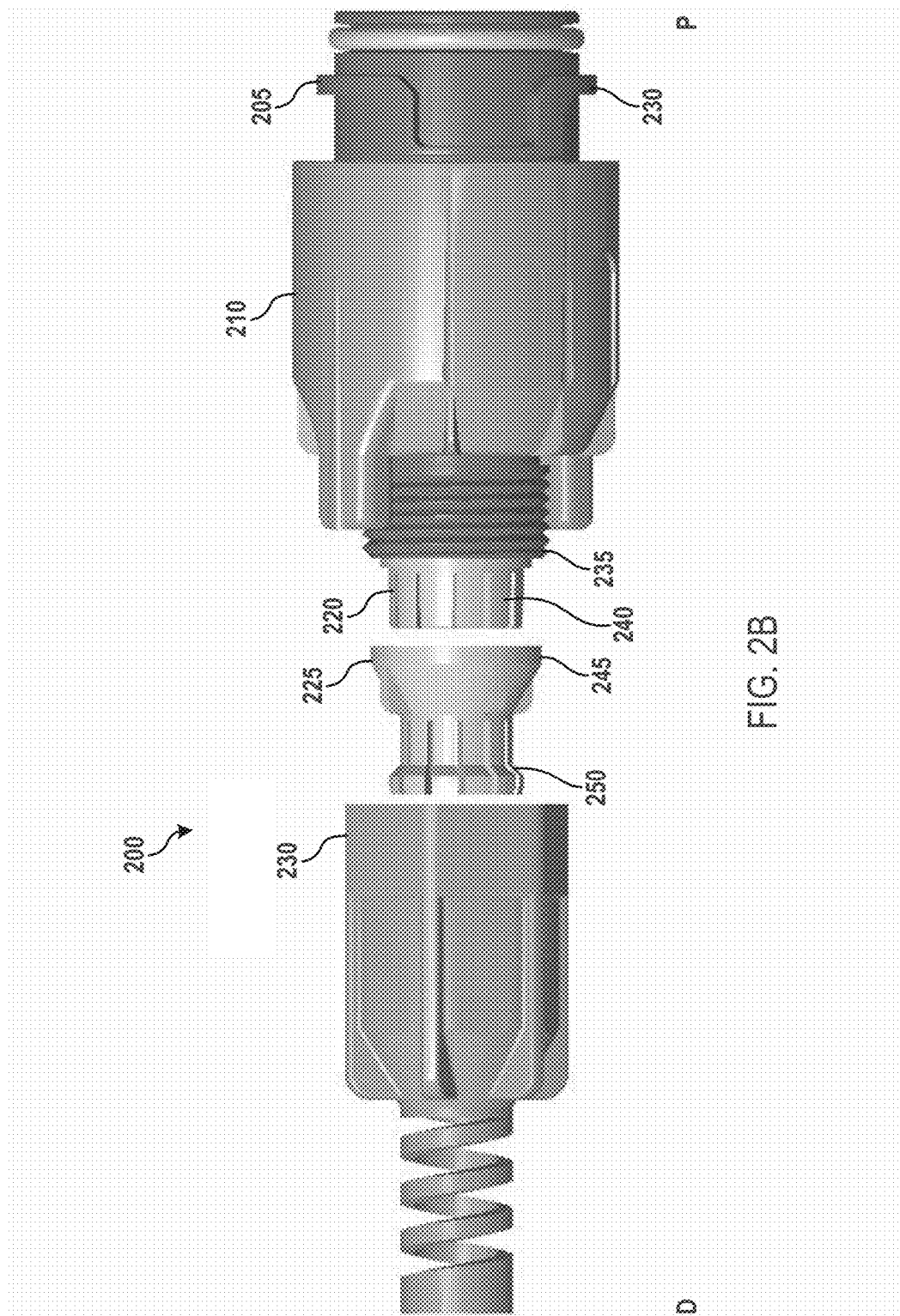

SEALABLE COMMUNICATION CABLE CONNECTION ASSEMBLIES

CROSS-REFERENCE TO RELATED APPLICATIONS

This application is a continuation of U.S. patent application Ser. No. 14/599,140, filed Jan. 16, 2015, which is incorporated herein by reference in its entirety.

FIELD OF THE INVENTION

The described technology generally relates to components for connecting data transmission elements and, more specifically, to sealable connection assemblies configured to sealably engage an adapter and a communication cable extending therethrough to prevent fluids, solid contaminants, and/or other materials from entering the connection assembly when the connection assembly is engaged with the adapter.

BACKGROUND

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that may be disrupted by the presence of fluid or solid contaminants. As such, fiber optic network segments connected using conventional technology are very susceptible to performance and/or availability degradation over time. Accordingly, telecommunication network providers would benefit from a connection assembly capable of maintaining a sealable and secure connection configured to prevent the ingress of unwanted materials into the connection assembly.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a sealable connection assembly may include an inner body having a threaded end and a connection end configured to engage an adapter, the threaded end being configured to rotatably engage a threaded element, a sealing element arranged at least partially between the inner body and the threaded element, the sealing element being arranged around at least one communication cable extending through the sealable connection assembly, a compression element configured to engage the sealing element and arranged at least partially between the sealing element and the threaded element, and a retainer body configured to be engaged by the threaded element when the threaded element rotatably engages the threaded end, wherein engagement of the retainer body by the threaded element forces a compression end of the retainer body to engage and compress at least a portion of the compression element around the sealing element, thereby compressing the sealing element against the at least one communication cable to form a sealing element seal therebetween.

In one aspect, the retainer body may include a gripping end arranged opposite the contact end, the gripping end being configured to be engaged and compressed by the threaded element when the threaded element rotatably engages the threaded end, thereby forcing the gripping end against the at least one communication cable such that the retainer body grips the at least one communication cable.

In an embodiment, a sealable connection assembly may include an inner body having a first connection end configured to engage an adapter and a second connection end arranged opposite the first connection end and configured to connection element, a sealing element arranged at least partially between the inner body and the threaded element, the sealing element being arranged around at least one communication cable extending through the sealable connection assembly, a compression element configured to engage the sealing element and being arranged at least partially between the sealing element and the connection element, and a retainer body configured to be engaged by the connection element when the connection element engages the threaded end, wherein engagement of the retainer body by the connection element forces a compression end of the retainer body to engage and compress at least a portion of the compression element around the sealing element, thereby compressing the sealing element against the at least one communication cable to form a sealing element seal therebetween.

In one aspect, the retainer body may include a gripping end arranged opposite the contact end, the gripping end being configured to be engaged and compressed by the threaded element when the threaded element rotatably engages the threaded end, thereby forcing the gripping end against the at least one communication cable such that the retainer body grips the at least one communication cable.

In an embodiment, a connection assembly may include an inner body having a first connection end configured to engage an adapter and a second connection end arranged opposite the first connection end and being configured to engage a tension element, and a retainer body configured to be engaged by the tension element when the tension element engages the threaded end, wherein the retainer body comprises a gripping end configured to be engaged and compressed by the tension element when the tension element engages the second connection end, thereby forcing the gripping end against at least one communication cable extending through the sealable connection assembly such that the retainer body forms a grip with the at least one communication cable.

BRIEF DESCRIPTION OF THE DRAWINGS

The above and other objects of the present invention will become more readily apparent from the following detailed description taken in connection with the accompanying drawings.

FIGS. 2A and 2B depict exploded views of an illustrative sealable connection assembly according to some embodiments.

DETAILED DESCRIPTION

Figure 1:
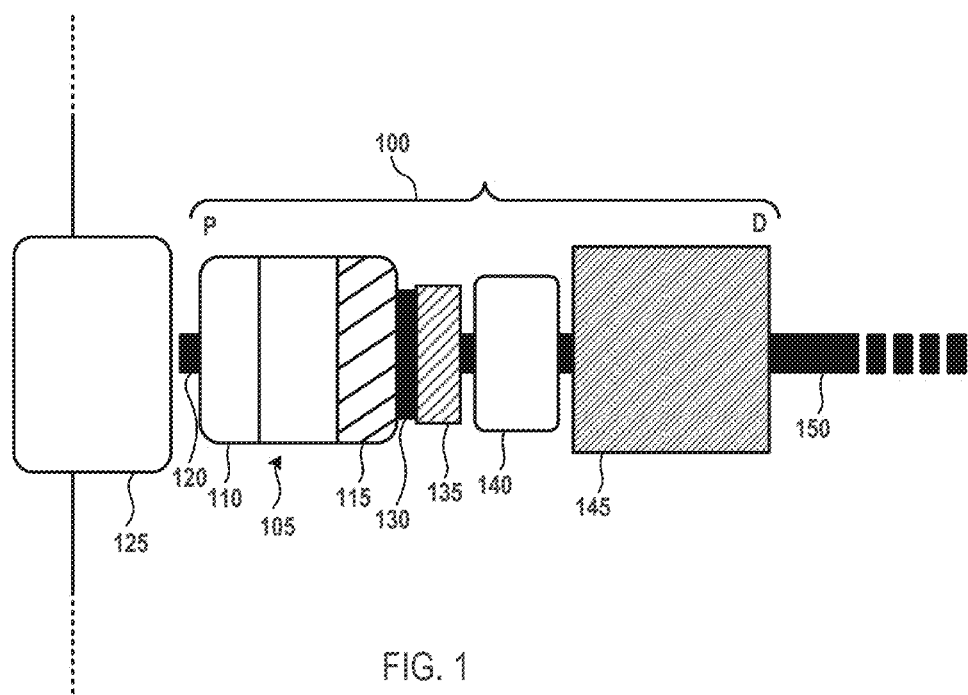
FIG. 1 depicts an illustrative sealable connection assembly according to some embodiments.

The described technology generally relates to components and assemblies formed therefrom that are configured to provide sealed connections for data transmission elements, such as cable segments, communication equipment, networking devices, and computing devices ("sealable connection assemblies"). The data transmission elements may be connected within a network, which may include any type of network capable of transmitting signals, electricity, or any other type of transmission medium. For instance, the network may include, without limitation, a communication network, a telecommunication network, an electrical network, a data network, a computer network, and any combination thereof In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connection assemblies may be configured to connect cable segments and/or devices within a fiber optic network using various standard connector types, adapters, transceivers, or the like, including, but not limited to, LC, ST, SC, FC, DIN, D4, SMA, E2000, Biconic, FullAXS, ODC, small form-factor pluggable (SFP), MPO and/or copper-type network connections, such as RJ-45 type connectors.

In some embodiments, the sealable connection assemblies may be configured to connect a connection assembly connector (for instance, a plug, male connector, connector, or the like) to a connection assembly adapter (for instance, a receptacle, female connector, adapter, or the like). In some embodiments, the connection assembly connector may include an LC-type connector and the connection assembly adapter may include an SFP adapter, transceiver, device, or the like ("adapter"). In some embodiments, the sealable connection assemblies may be configured to provide at least one seal within and/or between the connection assembly connector, the connection assembly adapter, and/or the connection therebetween. In some embodiments, a seal may generally operate to reduce, prevent, eliminate, or substantially eliminate the entry of fluids, water, air, dirt, contaminants, or other materials into the connection assembly connector, the connection assembly adapter, and/or the connection between the connection assembly connector and the connection assembly adapter. In some embodiments, the sealable connection assemblies may be configured to provide a seal between at least one portion of the sealable connection assembly and the adapter and a seal between a portion of the sealable connection assembly and a communication cable extending therethrough. In some embodiments, the sealable connection assemblies may be configured to provide a seal between a sealing element and the communication cable and a retainer body and the communication assembly. In some embodiments, at least one element of the sealable connection assembly may be configured to grip, "bite into," crimp, grasp, clasp, seize, clench or otherwise hold onto a communication cable running through the sealable connection assembly. In this manner, at least a portion of the sealable connection assembly may create a retention force operative to reduce or prevent forces applied to the sealable connection assembly and/or the communication cable from effecting portions of the sealable connection assembly, such as, for example, the seal generated between the sealable connection assembly and the communication cable.

FIG. 1 depicts an illustrative sealable connection assembly according to some embodiments. As shown in FIG. 1, a proximal end P of the sealable connection assembly 100 may include an inner body 105 having a first connection end 110 and a second connection end 115. In some embodiments, the first connection end 110 may be configured to engage, connect with, be coupled to, or otherwise interface with an adapter 125. In some embodiments, the first connection end 110 may be configured to connect a plug 120 terminating a cable 150 extending through the sealable connection assembly 100 to a corresponding receptacle (not shown) on the adapter 125. In some embodiments, the first connection end 110 may be configured to form a seal between the inner body 105 and the adapter 125. In a non-limiting example, the first connection end 110 may include and/or have an O-ring arranged thereon that is formed from one or more polymer materials, such as isoprene (for instance, rubber) or other elastomers, and is configured to form a seal between the first connection end and the adapter 125.

The inner body 105 may include a second connection end 115. In some embodiments, the second connection end 115 may be located on an end of the inner body 105 opposite the first connection end 110. In some embodiments, the second connection end 115 may be configured to fixedly engage, connect with, be coupled to, or otherwise interface with a tension element 120. The second connection end 115 and the tension element 120 may be connected using various connection methods, including, without limitation, a threaded connection, a friction fit, a bayonet-type connection, a snap fit, or the like.

A sealing element 130, a compression element 135, and a retainer body 140 may be arranged within the sealable connection assembly 100 around the communication cable 150 between the inner body 105 and a tension element 145 located at a distal end D of the sealable connection assembly. In some embodiments, the compression element 135 and the retainer body 140 may be configured to slide or otherwise move axially about the communication cable. In some embodiments, as the tension element 145 is connected to and/or is forming a connection with the second connection end 115, the tension element 145 may be drawn, pulled, or otherwise moved proximally toward the inner body 105. As the tension element 145 moves toward the inner body 105, the tension element may contact or otherwise engage the retainer body 140 and force the retainer body to also move proximally toward the inner body. The retainer body 140 may contact or otherwise engage the compression element 135, forcing the compression element to engage the sealing element 130. The movement of the sealing element 130 toward the proximal end P may be limited, for example, because the sealing element is coupled to or formed from the communication cable 150, the inner body 105 may prevent distal movement of the sealing element beyond a certain point, and/or due to a seal formed between the sealing element and the communication cable. As the tension element 145 is being connected to the second connection end 115, the tension element may apply a force to the compression element 130, thereby causing the compression element to engage and compress the sealing element 130. The compression of the sealing element 130 by the compression element 135 may force the sealing element to press inward against the communication cable with sufficient force to form a seal between the sealing element and the communication cable. In some embodiments, the sealing element 130 may be formed from one or more polymer materials, such as isoprene (for instance, rubber) or other elastomers.

In some embodiments, use of the retainer body 140 to grip and form a retention force with the communication cable may prevent forces applied to the sealable connection assembly 100 may withstand directly and/or through forces applied to the communication cable 150 from being transferred or otherwise effecting other components of the sealable connection assembly. For instance, use of the retainer body 140 to grip and form a retention force with the communication cable 150 may prevent forces applied to the sealable connection assembly 100 may withstand directly and/or through forces applied to the communication cable 150 from being transferred or otherwise effecting the seal formed between the sealing element 130 and the communication cable 150, for example, that may break, weaken, or otherwise effect the seal. In some embodiments, the sealable connection assembly 100 may be configured to withstand about 50 lbs. (pounds), about 100 lbs., about 125 lbs., about 150 lbs., about 200 lbs., about 300 lbs., about 400 lbs., about 50 lbs.to about 100 lbs., about 50 lbs.to about 150 lbs., about 50 lbs.to about 200 lbs., about 50 lbs.to about 300 lbs., about 50 lbs.to about 400 lbs., and any value or range between any two of these values (including endpoints). In some embodiments, the retainer body 140 may form a seal with the communication cable 150.

In some embodiments, at least a portion of the retaining body 140 may be configured to engage the communication cable 150. As the tension element 145 moves toward the inner body 105, the tension element may contact or otherwise engage the retainer body 140 and force a portion of the retainer body 140 to move inward toward the communication cable. In some embodiments, the retainer body 140 may form a seal with the communication cable 150. In some embodiments, the retainer body 140 may grip or "bite into" the communication cable 150 to prevent movement thereof and/or the breakage of any seal between the sealable connection assembly 100 and the communication cable, for instance, when a portion of the communication cable proximate to the sealable connection assembly is bent, rotated, vibrated, pulled (i.e., a "straight pull" in a direction parallel to the longitudinal axis of the communication cable), or otherwise subjected to a force.

The sealable connection assembly 100 and portions thereof may be made from various resilient materials, such as plastics, polymers, elastomers, rubber, silicon-based materials, metals, metal alloys, and any combination thereof In some embodiments, the sealable connection assembly 100 may have a total length when connected and sealed of about 50 millimeters, about 100 millimeters, about 125 millimeters, about 130 millimeters, about 150 millimeters, about 200 millimeters, about 300 millimeters and any value or range between any two of these values (including endpoints).

Figure 2A:
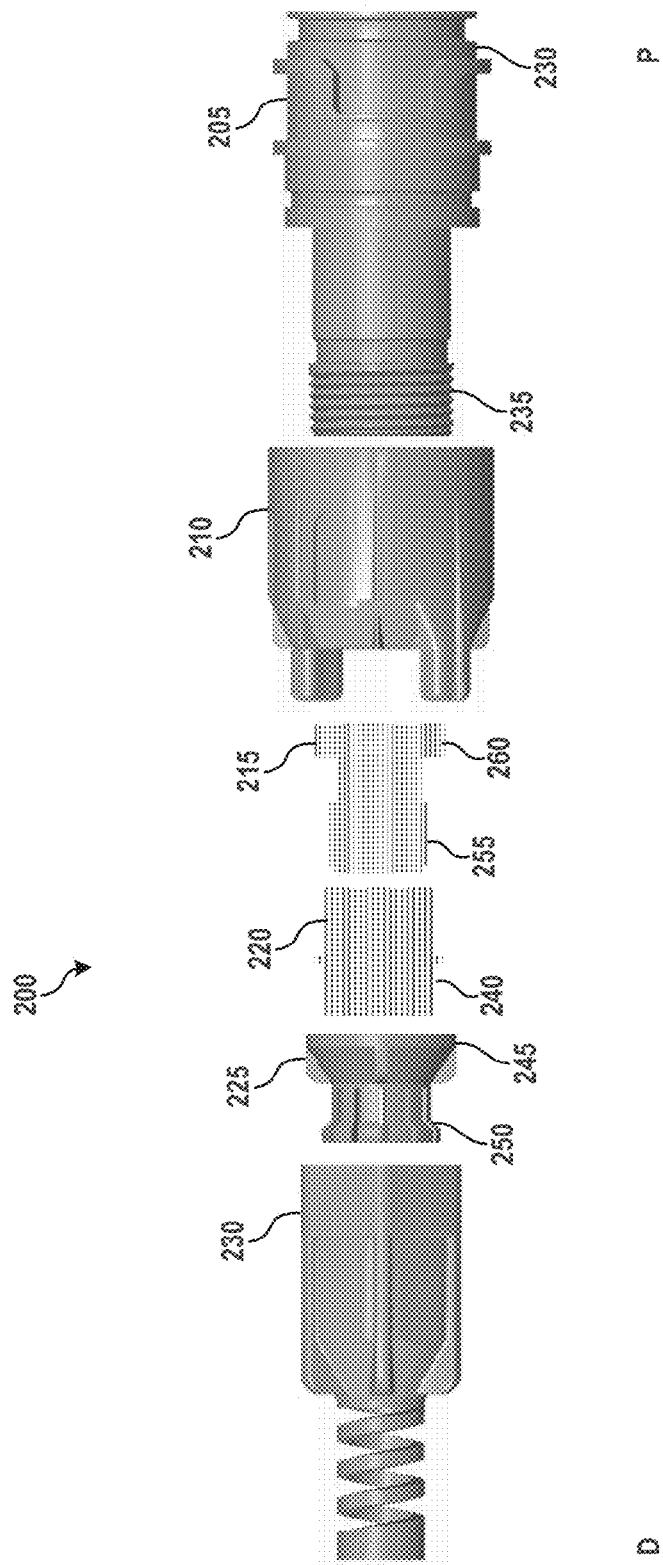

FIGS. 2A and 2B depict exploded views of an illustrative sealable connection assembly according to some embodiments. As shown in FIGS. 2A and 2B, a sealable connection assembly 200 may include an inner body 205 configured to be coupled to or otherwise engage a corresponding adapter (not shown). In some embodiments, engagement of the inner body 205 to the adapter may operate to connect a plug of a communication cable (not shown) extending through the sealable connection assembly 200 to a corresponding receptacle. The inner body 205 may include a connection end 230 configured to couple, connect, or otherwise engage the inner body to the adapter. The inner body 205 also include a threaded end 235 configured to engage a corresponding threaded interface of a threaded element 230 (a "threaded" tension element). An outer body 210 may be configured to slide or otherwise move over the inner body 205 to connect with or otherwise engage the adapter. In some embodiments, the outer body 210 may be configured to rotate about the inner body 205 and form a bayonet-type connection with the adapter.

A sealing element 215 may be arranged between the inner body 205 and a compression element 220. In some embodiments, the sealing element 215 may include a sealing end 260 and an engagement end 255. In some embodiments, engagement end 255 may be configured to engage a portion of the inner surface of the inner body 205 to prevent the sealing element 215 from moving toward a proximate end P of the sealable connection assembly 200. In some embodiments, the engagement end 255 may not engage a portion of the inner surface of the inner body 205. In such embodiments, proximal and distal movement of the sealing element 215 may be prevented when the sealing element forms a seal with the communication cable, as described in more detail below.

The threaded element 230 may be configured as a strain relief element, for instance, a strain relief boot or strain relief nut. The threaded element 230 may include an interior threaded interface corresponding to the threads of the threaded end 235. As such, the threaded element 230 may rotatably engage the threaded end 235 by being threaded thereon. As the threaded element 230 is being threaded onto the threaded end 235, the threaded element 230 may be pulled along the inner body 205 toward the proximal end P.

As the threaded element 230 is being pulled toward the proximal end P, an inner surface of the threaded element may engage a retainer body 225 and force the retainer body to also move toward the proximal end P. As the retainer body 225 moves proximally, the retainer body may engage the compression element 220. The retainer body 225 may include a contact end 245 configured to engage compression fingers 240 of the compression element 220 as the retainer body is forced toward the proximal end P. The compression element 220 may be arranged or may move to be arranged around at least a portion of the sealing element 215 (see FIG. 10 for a depiction of an illustrative sealing element in combination with an illustrative compression element according to some embodiments). In some embodiments, the compression element 220 may move axially along the communication cable until a proximal end of the compression element engages the engagement end 255 and/or a portion of the inner surface of the inner body 205.

In some embodiments, the compression element 220 may be positioned such that the compression fingers 240 are arranged around the sealing end 260. In some embodiments, the compression fingers 240 may include a lip, edge, or other formation configured to prevent movement of the sealing element toward the distal end D (see element 505 of FIGS. 5A and 5B). In this manner, as the compression element 220 engages the sealing element 215, the proximal movement of the sealing element may be prevented by, among other things, the engagement of the engagement end 255 and a portion of the inner surface of the inner body 205 and/or the distal movement of the sealing element may be prevented by, among other things, the engagement of the sealing end 260 with the compression finger edges (for instance, element 505 of FIGS. 5A and 5B).

As the threaded element 230 is being threaded onto the inner body 205, the contact end 245 may engage and compress the compression fingers 240 against the sealing end 260. Compression of the sealing end 260 by the compression fingers 240 may force the sealing end against the communication cable with sufficient pressure to form a seal between the sealing element 215 and the communication cable.

In some embodiments, as the threaded element 230 is being threaded onto the inner body 205, a gripping end 250 of the retainer body 225 may contact or otherwise engage at least a portion of an inner surface of the threaded element. The portion of the inner surface of the threaded element 230 may engage and compress the gripping end 250 against the communication cable such that the gripping end 250 grips, "bites into," crimps, grasps, clasps, seizes, clenches, or otherwise holds onto the communication cable. In this manner, the retainer body 225 may form a grip or cable retention force ("cable retention") with the communication cable. In some embodiments, the retainer body 225 may operate as or similar to a cable crimp when the grip has been established with the communication cable.

In some embodiments, the cable retention force may operate to reduce or prevent forces applied to the sealable connection assembly 200 and/or the communication cable from being transferred to and/or otherwise effecting other components of the connection assembly, such as the components that form the seal generated between the sealable connection assembly and the communication cable. In some embodiments, the cable retention may operate to prevent any side load (for instance, when the cable is bent proximate to the sealable connection assembly 200) on the cable from being transferred to the sealing element 215 and potentially breaking, weakening, or otherwise effecting the seal between the sealing element and the communication cable. In some embodiments, the cable retention may operate to prevent any "straight pull" forces (for instance, a force on the communication cable pulling the communication cable in a direction away from the sealable connection assembly 200 (i.e., parallel to a longitudinal axis of the communication cable)) on the communication cable from being transferred to the sealing element 215 and potentially breaking, weakening, or otherwise effecting the seal between the sealing element and the communication cable.

Figure 3A:
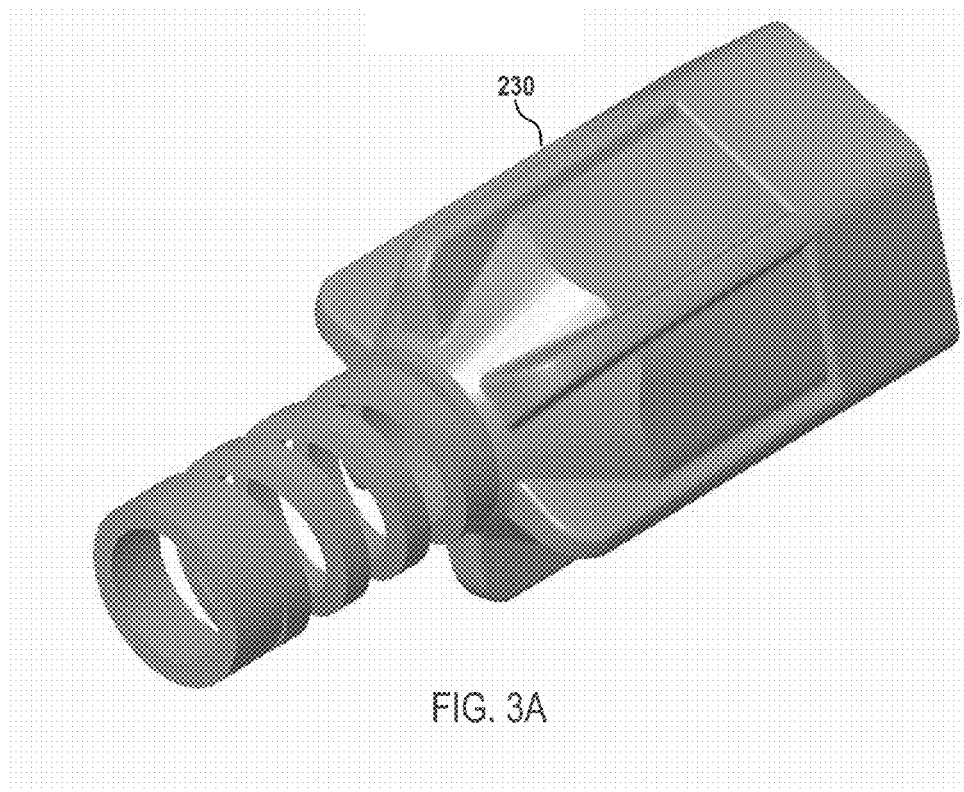
FIGS. 3A and 3B depict isometric views of a connection element according to some embodiments.
Figure 3B:
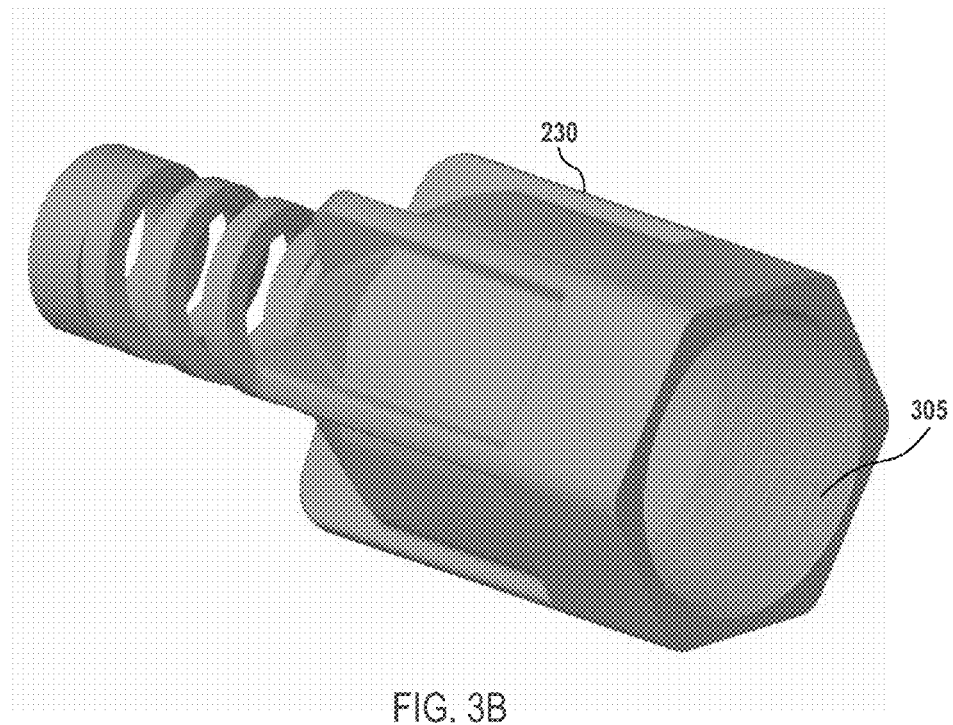

FIGS. 3A and 3B depict isometric views of a connection element according to some embodiments. As shown in FIGS. 3A and 3B, the connection element may be configured as a threaded element 230, such as a strain relief boot or strain relief nut. As shown in FIG. 3B, the threaded element 230 may include a threaded interface 305 configured to allow the threaded element to be threaded onto an inner body 205.

Figure 4A:
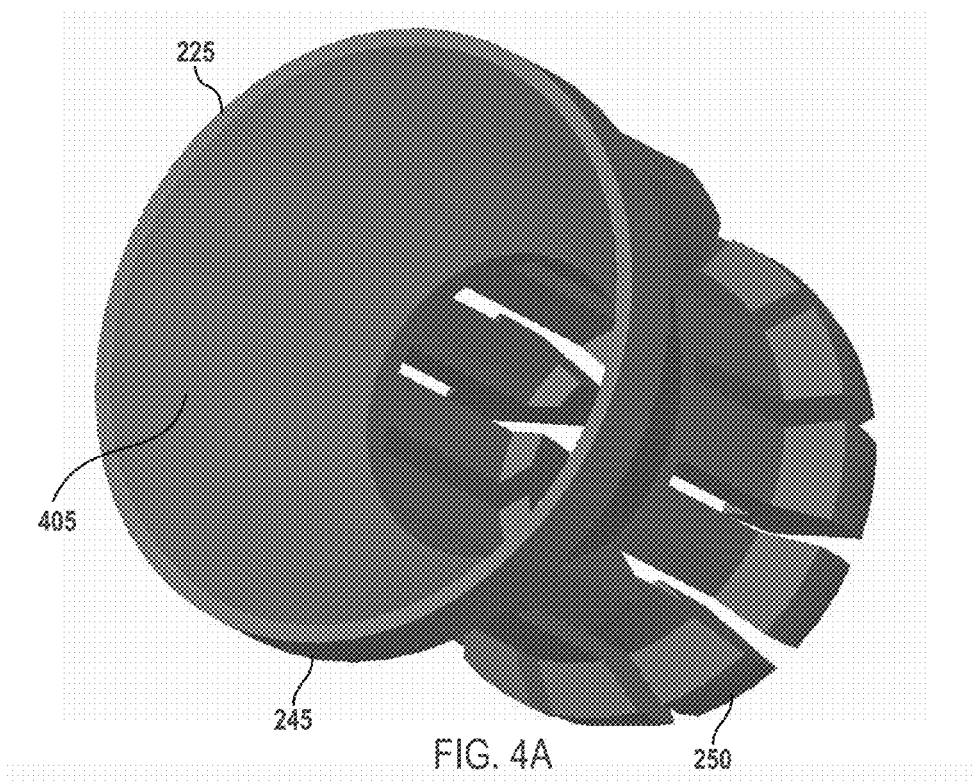
FIGS. 4A and 4B depict isometric views of a retainer body according to some embodiments.
Figure 4B:
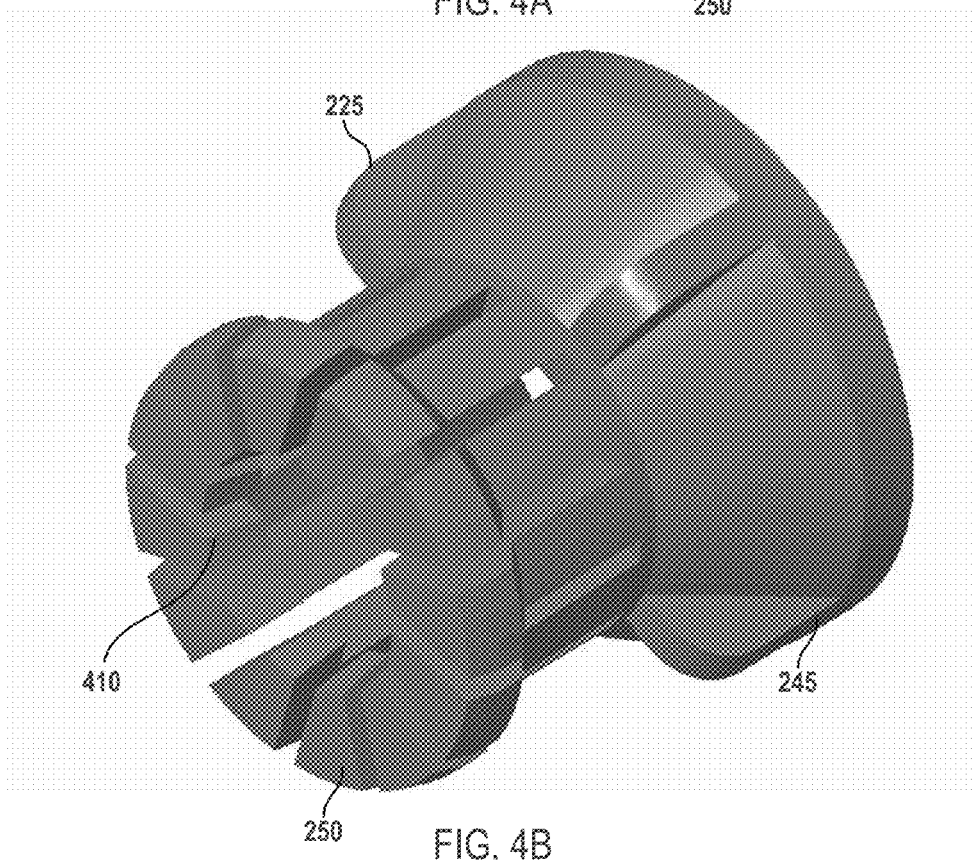

FIGS. 4A and 4B depict isometric views of a retainer body according to some embodiments. As shown in FIGS. 4A and 4B, the retainer body 225 may include a contact end 245 having a contact surface 405 configured to engage and compress the compression fingers 240 of the compression element 220. In some embodiments, the contact surface 405 may have a tapered shape, for instance, to facilitate the engagement with and/or the compression of the compression fingers 240. The gripping end 250 of the retainer body 225 may include gripping elements 410, for instance, finger elements including, without limitation, hooks, grips, bumps, teeth, edges, ridges, and/or projections configured to grip and/or "bite into" a communication cable. In some embodiments, at least a portion of the gripping end 250 may be configured to form a seal with the communication cable when the gripping end grips the communication cable.

Figure 5A:
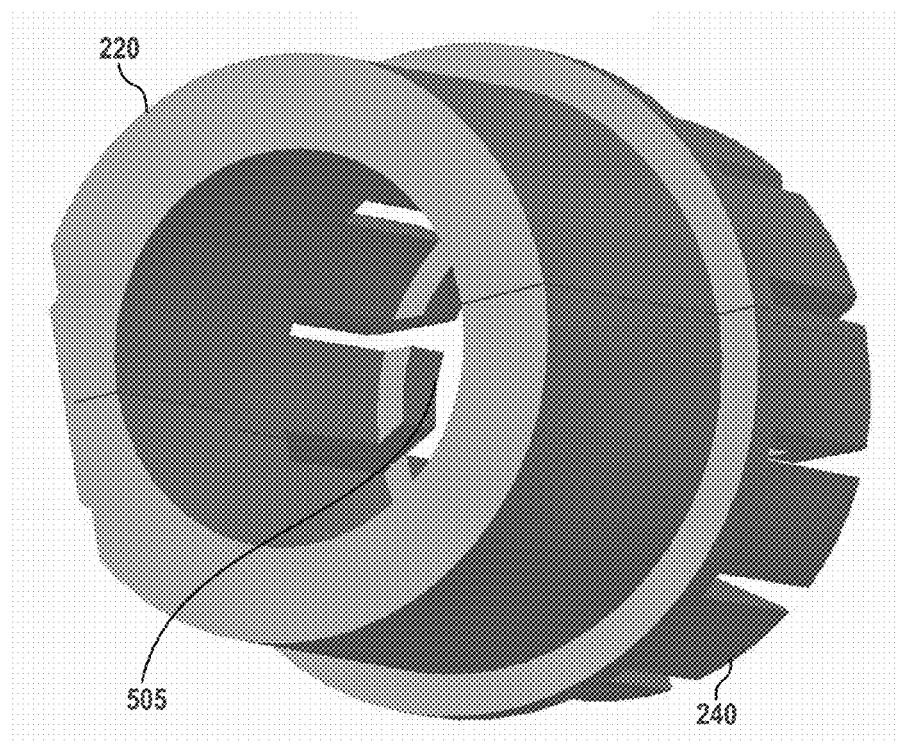
FIGS. 5A and 5B depict isometric views of a compression element according to some embodiments.
Figure 5B:
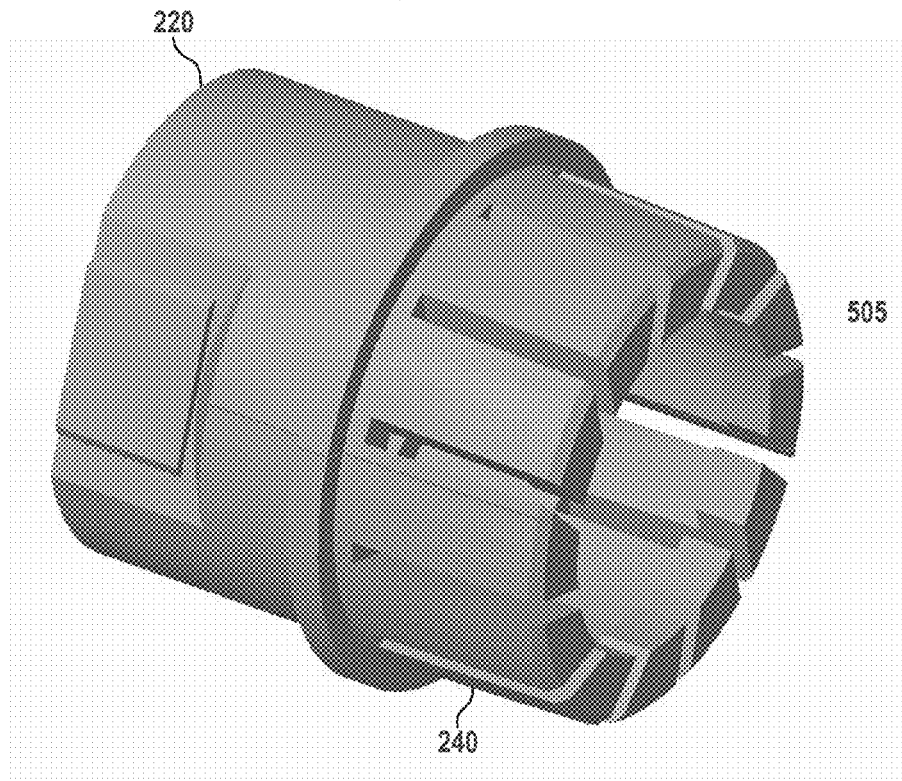
Figure 6A:
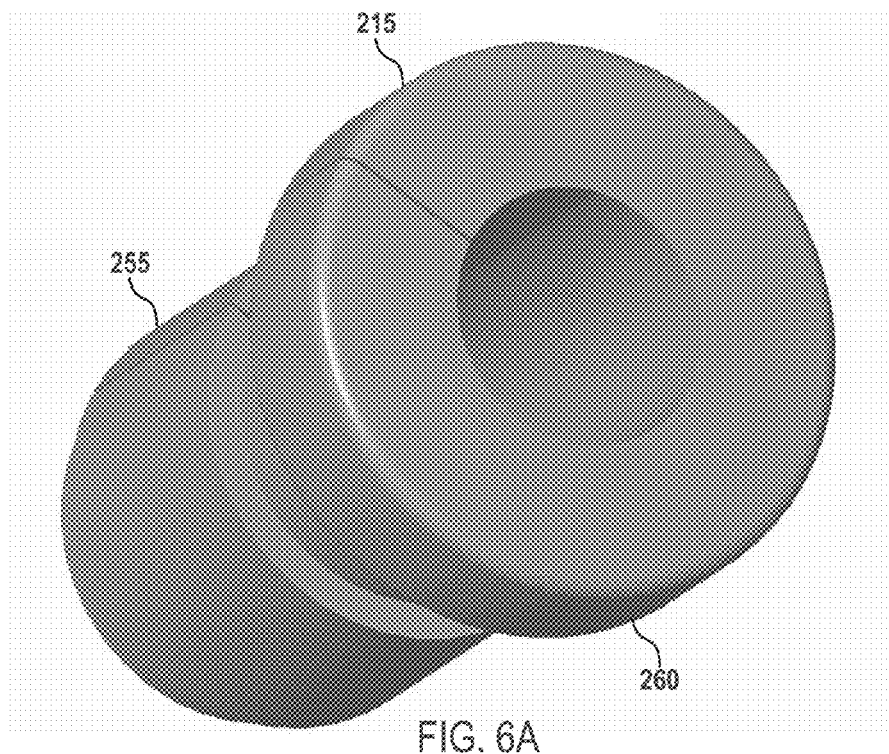
FIGS. 6A and 6B depict isometric views of a sealing element according to some embodiments.
Figure 6B:
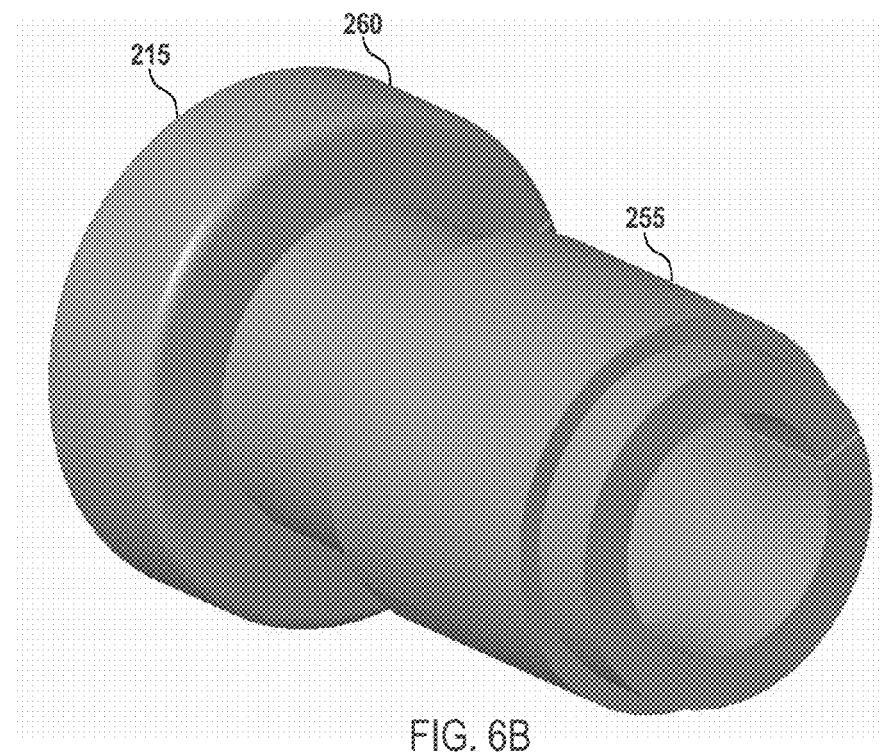
Figure 7A:
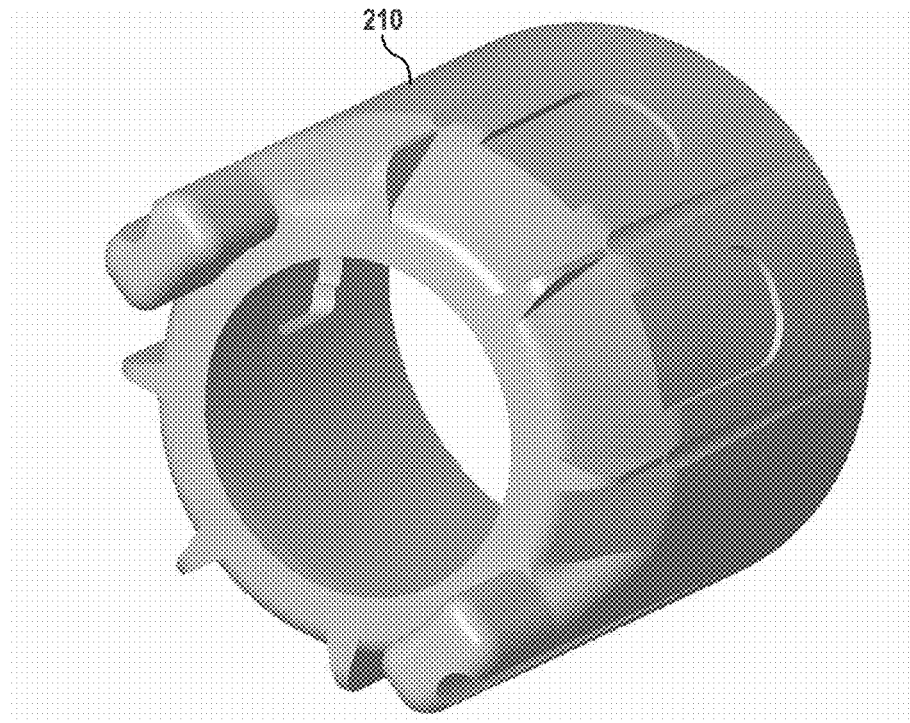
FIGS. 7A and 7B depict isometric views of an outer shell according to some embodiments.
Figure 7B:
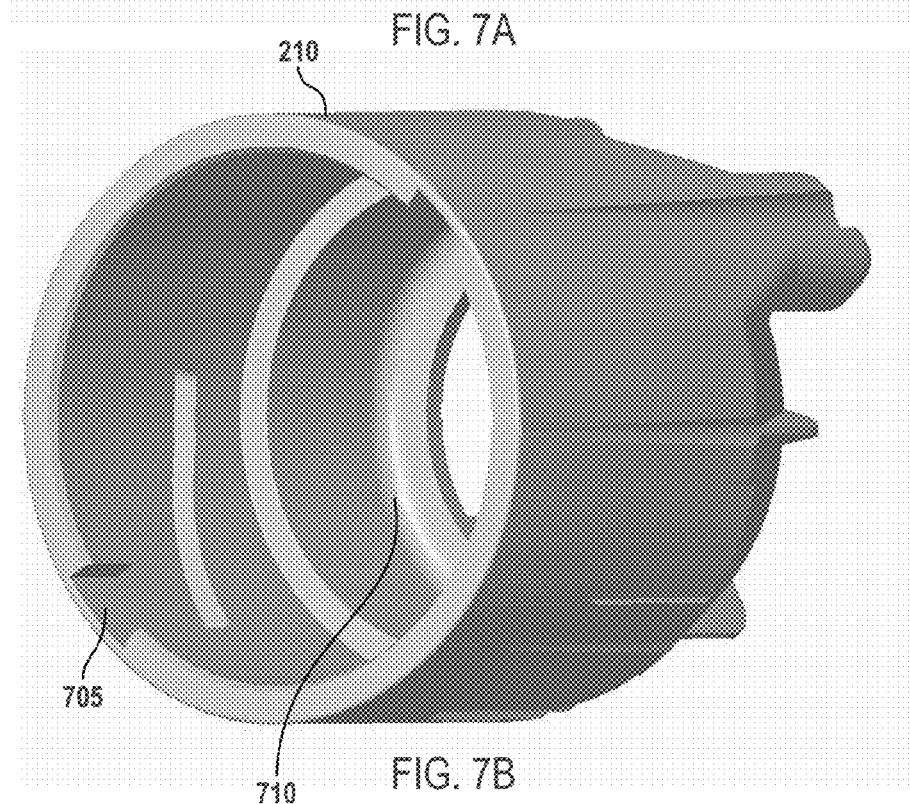

FIGS. 5A and 5B depict isometric views of a compression element according to some embodiments. In some embodiments, as shown in FIGS. 5A and 5B, the compression fingers 240 may include a lip, edge, or other formation configured to prevent movement of the distal movement of the sealing element 220. FIGS. 6A and 6B depict isometric views of a sealing element according to some embodiments. FIGS. 7A and 7B depict isometric views of an outer shell according to some embodiments. As shown in FIG. 7B, the outer shell 210 may include an adapter connection element 705 for coupling the sealable connection assembly to an adapter, such as a bayonet-type connection element. In some embodiments, the outer shell 210 may include an engagement surface 710 configured to engage a corresponding external surface of the inner body 205. In this manner, as the outer shell 210 is coupled to the adapter, the engagement surface 710 may prevent distal movement of the inner body 205 away from the adapter and, therefore, distal movement of the sealable connection assembly 200 from the adapter.

Figure 8:
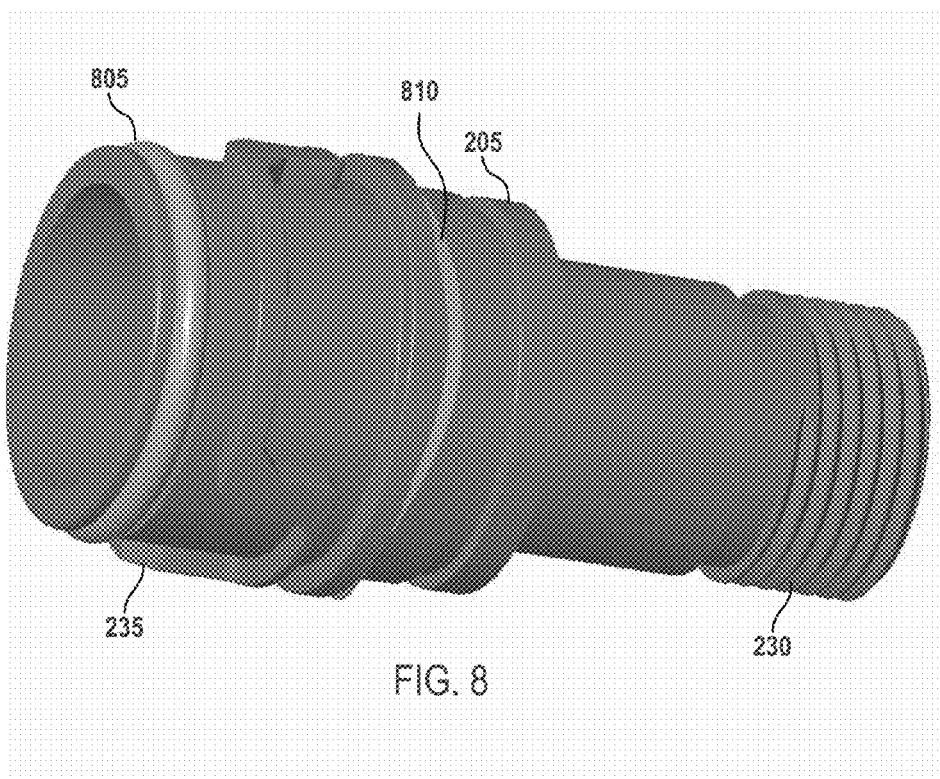
FIG. 8 depicts an isometric view of an inner body according to some embodiments.

FIG. 8 depicts an isometric view of an inner body according to some embodiments. As shown in FIG. 8, the connection end 235 of the inner body 205 may be configured to receive an O-ring 805 that may form a seal between the inner body and the adapter. In some embodiments, a wave spring 810 may be arranged around a portion of the inner body 205, for instance, to provide resistance to the outer shell 210. The wave spring 810 may be formed from various materials, such as a metal and/or metal alloy material.

Figure 9A:
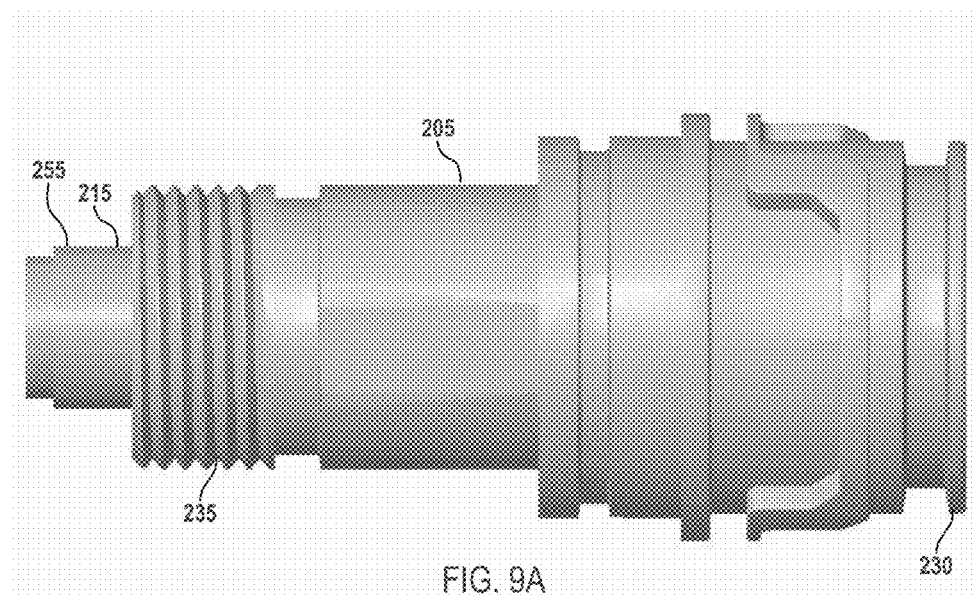
FIGS. 9A and 9B depict views of an illustrative sealing element in combination with an illustrative inner body according to some embodiments.
Figure 9B:
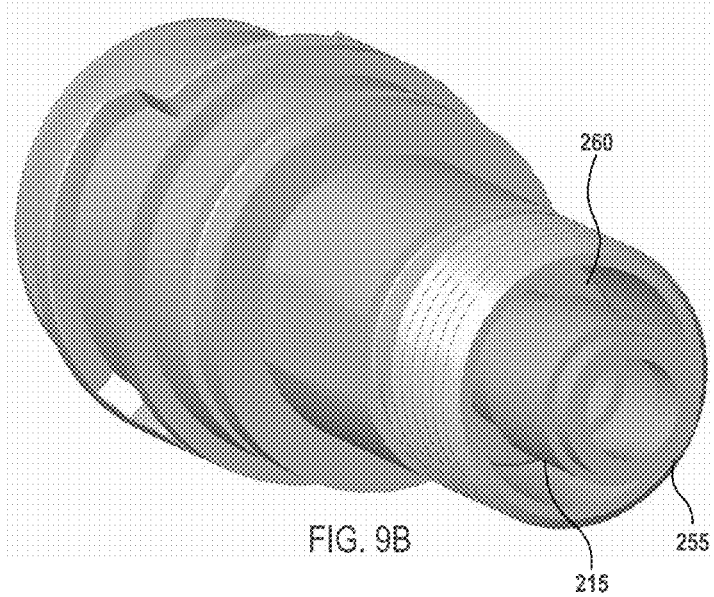
Figure 10:
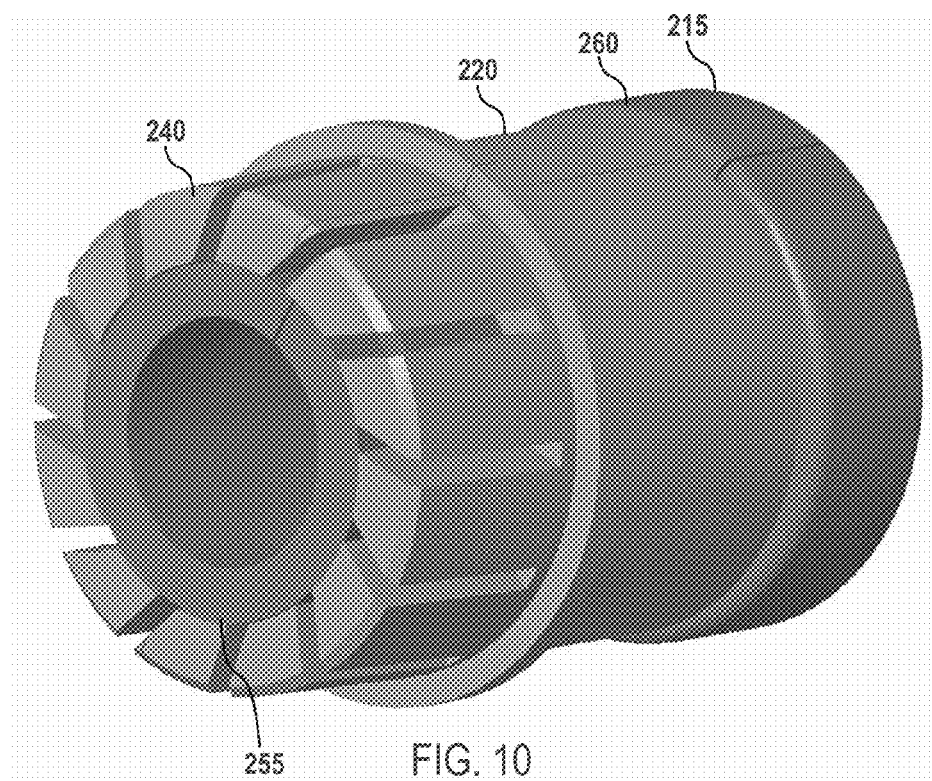
FIG. 10 depicts an illustrative sealing element in combination with an illustrative compression element according to some embodiments.

FIGS. 9A and 9B depict views of an illustrative sealing element in combination with an illustrative inner body according to some embodiments. FIG. 10 depicts an illustrative sealing element in combination with an illustrative compression element according to some embodiments. Conventional connection assemblies having sealing functionality, such as cable gland assemblies, may be able to create a seal within the assembly. However, for such conventional connection assemblies, the cable retention force (or pull force) is only held by the compression of the seal and, therefore, is not strong as it is only held by the friction of the (rubber) seal. In addition, when a side load (such as the bending and pulling of the communication cable) is applied, the force may be applied to the seal such that the seal function of the conventional connection assembly may be broken.

Figure 11:
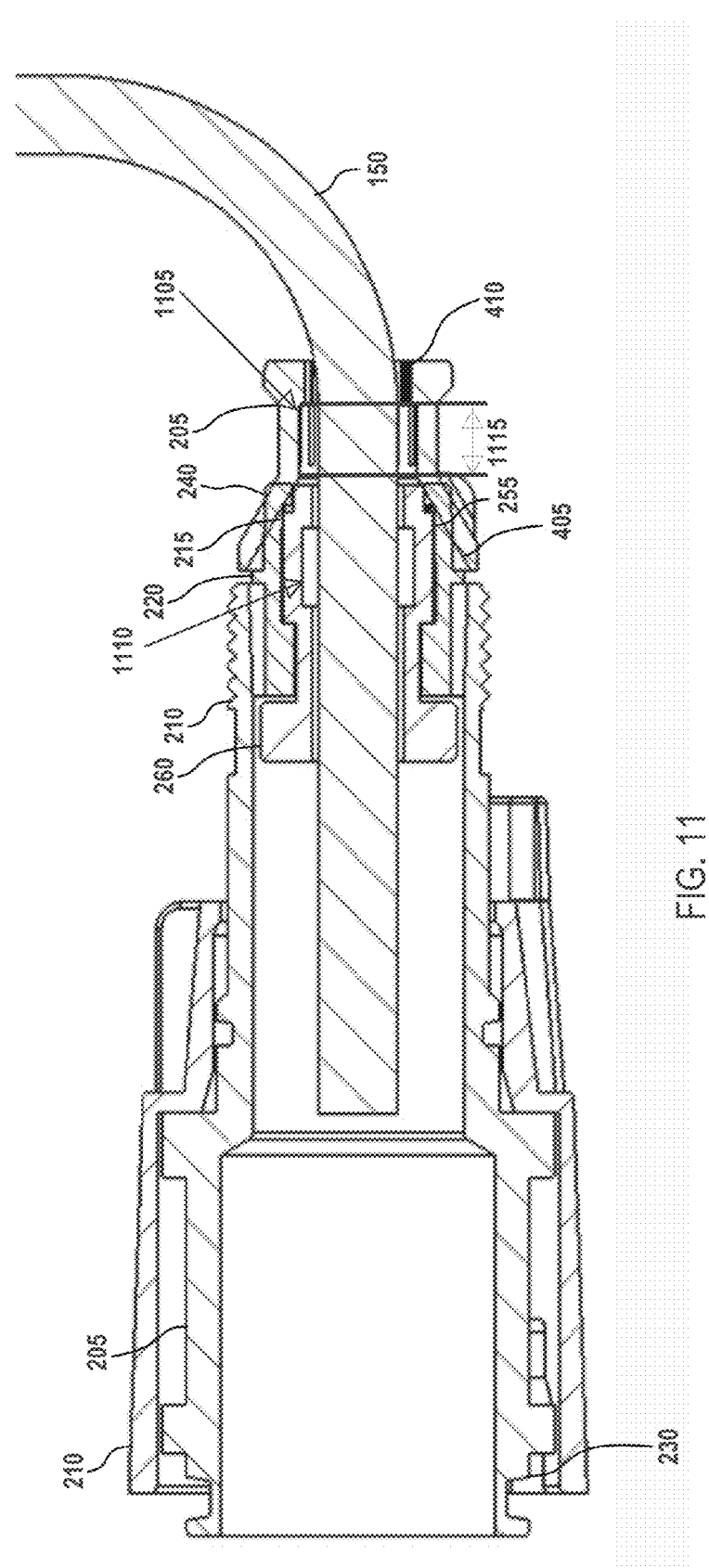
FIG. 11 depicts an internal view of an illustrative sealable connection assembly according to some embodiments.

FIG. 11 depicts an internal view of an illustrative sealable connection assembly according to some embodiments. As shown in FIG. 11, the gripping of the communication cable 150 by the gripping end 250 of the retainer body 225 may generate a cable retention force that may operate to prevent any side load force (for instance, bending of the cable), straight pull forces, and/or any other type of force being applied to the sealable connection assembly 200 and/or the communication cable 150 from being transferred to the sealing element 215 and breaking, weakening, or otherwise effecting the seal formed between the sealing element and the communication cable. Such cable retention force may operate to alleviate the issues with conventional connection assemblies being able to handle side load forces and/or straight pull forces while maintaining a proper seal within the connection assembly. For example, the cable retention force may be applied, effective, operative, or the like in area 1115 by the grip 1105 of the gripping end 250 of the retainer body 225 provided according to some embodiments. This retention force or grip 1105 may prevent forces, such as side bend forces, flexing forces, or straight pull forces, being applied to the sealable connection assembly 200 from being transferred to and/or effecting the water seal area 1110 provided by the sealing element 215 as described according to some embodiments. In this manner, a sealable connection assembly 200 configured according to some embodiments may be capable of maintaining a seal even if the sealable connection assembly is being subjected to forces that may be sufficient to disrupt the seal of conventional connection assemblies.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A sealable connection assembly comprising:
   an inner body;
   a tension element configured to engage the inner body;
   a sealing element arranged such that at least one communication cable extends through the sealable connection assembly;
   a compression element configured to engage the sealing element to form a seal between the sealing element and the at least one communication cable when the tension element engages the inner body; and
   a retainer body having a gripping end configured to be compressed when the tension element engages the inner body and to generate a cable retention force for substantially preventing transfer of forces to the sealing element so as to maintain the seal, the sealable connection assembly being configured to withstand about 50 pounds to about 400 pounds while maintaining the sealing element seal.

2. The sealable connection assembly of claim 1 further configured to withstand about 50 pounds to about 300 pounds while maintaining the sealing element seal.

3. The sealable connection assembly of claim 1 further configured to withstand about 150 pounds while maintaining the sealing element seal.

4. The sealable connection assembly of claim 1, wherein the gripping end is configured to engage the at least one communication cable.

5. The sealable connection assembly of claim 1, wherein the retainer body further comprises a contact end opposite to the gripping end, the contact end being configured to engage and compress at least a portion of the compression element around the sealing element when the tension element engages the inner body, thereby compressing the sealing element against the at least one communication cable to form the seal.

6. The sealable connection assembly of claim 1, wherein the cable retention force substantially prevents at least one of a side load force and a straight pull force on the communication cable from unsealing the sealing element seal.

7. The sealable connection assembly of claim 1, wherein the sealing element comprises an engagement end and the compression element comprises a proximal end, the engagement end of the sealing element being designed to couple with the proximal end of the compression element.

8. The sealable connection assembly of claim 7, wherein the compression element is configured to move axially along the at least one communication cable until the proximal end of the compression element engages the engagement end of the sealing element.

9. The sealable connection assembly of claim 7, wherein the compression element comprises compression fingers arranged around the engagement end of the sealing element.

10. The sealable connection assembly of claim 9, wherein the compression fingers comprise a formation configured to prevent movement of the sealing element.

11. The sealable connection assembly of claim 10, wherein the proximal movement of the sealing element may be prevented by the engagement of the engagement end of the sealing element with the compression finger formation.

12. A sealable connection assembly comprising:
    an inner body;
    a tension element configured to engage the inner body;
    a sealing element arranged such that at least one communication cable extends through the sealable connection assembly;
    a compression element configured to engage the sealing element to form a seal between the sealing element and the at least one communication cable when the tension element engages the inner body; and
    a retainer body having a gripping end configured to be compressed when the tension element engages the inner body and to generate a cable retention force for substantially preventing transfer of forces to the sealing element so as to maintain the seal, wherein the gripping end is configured to engage the at least one communication cable.

13. A sealable connection assembly comprising:
    an inner body;
    tension element configured to engage the inner body;
    a sealing element arranged such that at least one communication cable extends through the sealable connection assembly;
    a compression element configured to engage the sealing element to form a seal between the sealing element and the at least one communication cable when the tension element engages the inner body; and
    a retainer body having a gripping end configured to be compressed when the tension element engages the inner body and to generate a cable retention force for substantially preventing transfer of forces to the sealing element so as to maintain the seal, wherein the sealing element comprises an engagement end and the compression element comprises a proximal end, the engagement end of the sealing element being designed to couple with the proximal end of the compression element.

14. The sealable connection assembly of claim 13, wherein the compression element is configured to move axially along the at least one communication cable until the proximal end of the compression element engages the engagement end of the sealing element.

15. The sealable connection assembly of claim 13, wherein the compression element comprises compression fingers arranged around the engagement end of the sealing element.

16. The sealable connection assembly of claim 15, wherein the compression fingers comprise a formation configured to prevent movement of the sealing element.

17. The sealable connection assembly of claim 16, wherein the proximal movement of the sealing element may be prevented by the engagement of the engagement end of the sealing element with the compression finger formation.

* * * * *